Jan. 16, 1934.　　　G. E. HULSE　　　1,943,316
REFRIGERATION
Filed Dec. 6, 1929

INVENTOR
George E. Hulse
BY Janney, Blair & Curtis
ATTORNEYS

Patented Jan. 16, 1934

1,943,316

UNITED STATES PATENT OFFICE 1,943,316

REFRIGERATION

George E. Hulse, New Haven, Conn., assignor to The Safety Car Heating & Lighting Company, a corporation of New Jersey Application December 6, 1929. Serial No. 412,123

15 Claims. (Cl. 62—91.5)

This invention relates to refrigeration.

One of the objects thereof is to provide apparatus for refrigerating characterized by reliable and economical action and by simplicity and durability of construction. Another object is to provide dependable and practical means for maintaining a cooling surface at a substantially predetermined temperature. Another object is to provide an art of refrigeration which can be conveniently and effectively carried on at low cost. Other objects will be in part obvious and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

Figure 1:
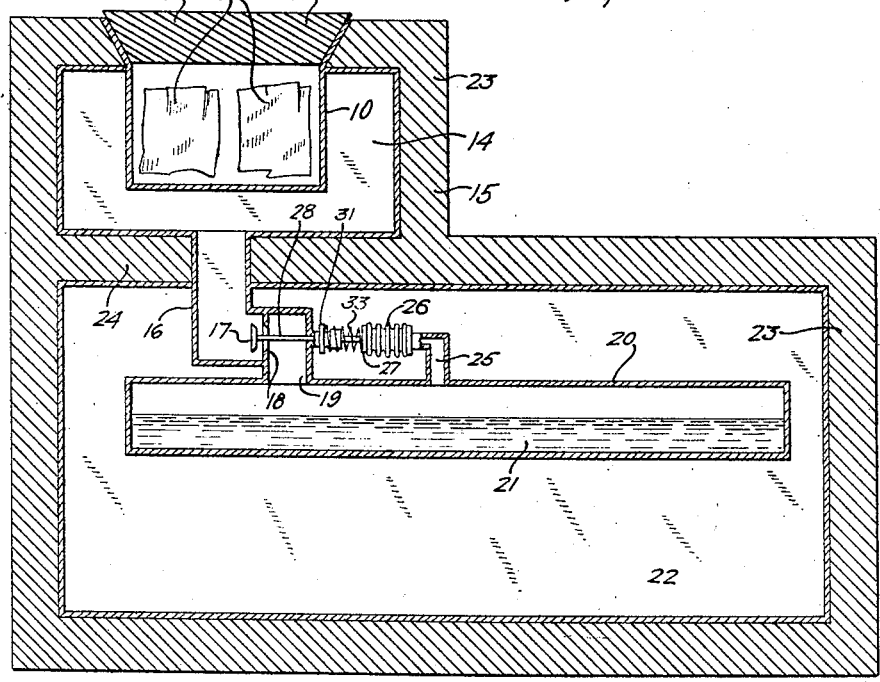
Figure 2:
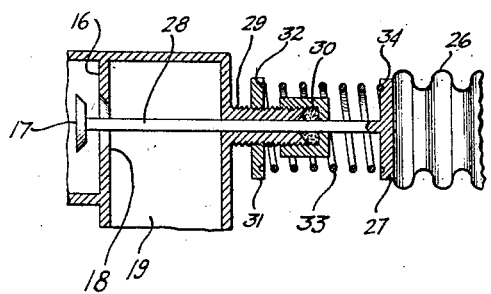

In the accompanying drawing, in which is shown one of various possible embodiments of this invention, Figure 1 is a diagrammatic sectional view; and Fig. 2 is a longitudinal detailed sectional view of certain parts shown in Fig. 1 on a larger scale.

Similar reference characters refer to similar parts throughout both views of the drawing.

Turning to the drawing in detail, there is shown at 10 a container for a refrigerant 11 which may take the form of ordinary water ice or solid carbon dioxide or other suitable substance. This container, which is formed of heat-conducting material, such as copper, is provided with a flaring opening on its upper side, as indicated at 12, within which is fitted a closure 13 of heat-insulating material.

A chamber 14 having walls formed of sheet metal or other suitable substance as indicated at 15 has fitted thereto the container 10 in such manner that the contents of this chamber jacket the container and are adapted to transmit heat thereto. The bottom portion of the chamber walls 15 is downwardly extended as at 16 to form a passage leading to a valve 17 controlled as hereinafter described. Beyond the valve seat 18 a passage 19 leads downwardly to an evaporating container 20. This container 20 is formed of heat-conducting material and is positioned within a heat-insulated chamber 22 which it is desired to refrigerate and access to which may be gained by any suitable doors or the like (not shown).

Within the container 20 is positioned a suitable volatile liquid, indicated at 21. I prefer to have the liquid 21 in the container 20 under a pressure above atmospheric pressure at or below the temperature which it is desired to maintain in the chamber 22. For example, if I desire to maintain a temperature of approximately 10° F. in chamber 22, I might place iso-butane in container 20, for iso-butane boils at substantially 10° F. under atmospheric pressure. With the pressure above atmospheric, the apparatus is enabled to maintain refrigerating action in case an accidental leakage in the liquid-enclosing system should take place. I wish it to be understood, however, that, in so far as certain features of my invention are concerned, the pressure might be below atmospheric pressure, though in that case the occurrence of a leak in the enclosing system would let air leak into the system and detrimentally affect the refrigerating action.

Chambers 14 and 22 are encased in heat-insulating material as indicated at 23, and the bottom wall of the container 15 is likewise heat-insulated as shown at 24.

Upwardly leading from the receptacle 20 is a conduit 25 terminating in an expansible capsule 26 adapted to extend in length as its internal pressure increases and to contract proportionately to a decrease of such pressure. The arrangement of this capsule 26 and the parts controlled thereby is best shown in Fig. 2 of the drawing, to which reference is now made.

Secured to the free end of capsule 26 is a plate 27 to which is affixed the stem 28 of valve 17. This valve stem passes through and has a sliding fit in a boss 29 formed on the outer surface of the walls of passage 19. Boss 29 has on its outer end a gland or stuffing-box 30 of suitable construction so as to prevent the escape of fluid without giving rise to undue friction. Also threaded upon the outer surface of the boss 29 is a nut 31 having a circular seat 32 within which rests one end of a spiral spring 33 having its opposite end seated in a suitable groove 34 in the plate 27. Spring 33 tends to compress the capsule 26 upon a decrease of pressure therein, and the initial tension of the spring, and consequently its action, may be adjusted and controlled by rotation of the nut 31. Thus the action of the capsule 26 in operating the valve 17 may be adjusted so as to become effective at any desired pressure.

Considering now the action of this apparatus, and assuming the spring 33 to be so adjusted as to permit the operation of the capsule 26 by any substantial pressure over atmosphere, it will be seen that whenever the walls of the container 20 attain a temperature in excess of that desired, the liquid 21 will evaporate with a cooling action and the pressure of its vapor acting through the capsule 26 will cause the valve 17 to open. The vapor then passes into the chamber 14 and is cooled and condensed by contact with the walls 10. The condensed liquid trickles back past the valve 17 into the container 20, and this action automatically continues until the desired and predetermined temperature within the container 20 has again been attained. This will result in a fall in pressure in the capsule 26 and a closure of the valve 17. This closed condition will be maintained until there is again a tendency to excess of temperature within the container 20.

The action above described is automatic and may be substantially continuous. Its effect will be to maintain the temperature of the walls of the container 20 at substantially the predetermined value. If it is desired to vary this value, the spring 33 may be given a greater initial tension, in which case the capsule 26 will require a greater pressure to open the valve 17. The greater pressure upon the liquid 21 will raise its temperature of evaporization and the action hereinbefore described will take place at this higher temperature, and the higher temperature of the walls of container 20 will in a similar manner be maintained.

Assuming a small and substantially constant heat leakage through the walls of the chamber 22, it will be seen that the maintenance of the container 20 at a substantially constant surface temperature will result in the maintenance of the interior of the chamber 22 at a likewise substantially constant temperature.

As no exterior source of power is utilized, it will be seen that this refrigerating action depends as its ultimate source of cooling on the frozen body 11. It is to be understood that the term "frozen body" is used in a broad sense to cover any substance equivalent to those hereinbefore illustratively suggested. The cooling action of this body is brought into play only as it is required to maintain the desired refrigerating effect. When the refrigerating chamber 22 is at substantially the desired temperature, the frozen body 11 is substantially encased in heat-insulating material and remains unimpaired. Not only is the cooling effect of the ice or other suitable material thus economically used, but it is automatically controlled so as to give the desired, and preferably adjustable, substantially constant cooling temperature. Also, as there is a double seal against the passage of air or other fluid between the interior of the container 10 and the chamber 22, the latter is kept dry notwithstanding the presence of drip water or other wet surfaces in the ice-containing chamber.

From the foregoing it will be seen that there is provided apparatus and an art or method in which the objects of this invention are achieved and the advantages hereinbefore noted are among others present. There is no required fuel or power in any form, and except for the valve the apparatus is free from moving parts.

As many possible embodiments may be made of the mechanical features of the above invention and as the art herein described might be varied in various parts, all without departing from the scope of the invention, it is to be understood that all matter herein set forth or shown in the accompanying drawing is to be interpreted as illustrative and not in a limiting sense.

I claim:
1. In refrigeration apparatus, in combination, containing means for a volatile liquid adapted to act as a cooling device by the evaporation of said liquid, a conduit for conducting vapor from said liquid to a cool body to condense said vapor and for returning condensed liquid from said conduit to said containing means, a valve for controlling the flow through said conduit, and means responsive to the temperature of said liquid in said containing means for controlling the actuation of said valve.

2. In refrigerating apparatus, in combination, means forming a chamber, cooling means associated with said chamber, means forming a space whose temperature is to be regulated, a container having therein a volatile liquid and positioned in thermal contact with said space, a single conduit for conducting vapor from said container to said chamber for condensation and condensate from said chamber to said container, a valve for controlling the flow of vapor in said conduit, and means controlling said valve in accordance with temperature conditions within said space, said means comprising a device responsive to the pressure in said container.

3. In refrigerating apparatus, in combination, means forming a space whose temperature is to be regulated, means containing a volatile liquid in thermal contact with said space, cooling means, a single conduit connecting said containing means with said cooling means, said cooling means adapted to operate at a temperature below the temperature to be maintained in said space, and a valve controlling said conduit, said valve being responsive to the pressure in said containing means.

4. In refrigerating apparatus, in combination, means forming a space which is to be maintained at a certain predetermined temperature, means containing a volatile liquid adapted to boil at some point below said temperature, means containing a medium colder than said predetermined temperature, a single conduit connecting said last-mentioned means with said containing means, and a valve for controlling said conduit, said valve being responsive to the pressure in said containing means, and adapted to open upon a rise of pressure in said container caused by the boiling of said volatile liquid.

5. In refrigerating apparatus, in combination, means forming a space which is to be maintained at a certain predetermined temperature, means containing a volatile liquid adapted to boil substantially below said temperature, a chamber, cooling means associated with said chamber, means forming a single passage connecting said chamber with said containing means, said cooling means adapted to operate at a temperature below said predetermined temperature, and means for controlling said connecting means responsive to the pressure in said containing means and adapted to open when said last-mentioned pressure rises above the pressure in said chamber.

6. In refrigerating apparatus, in combination, means forming a space which is to be maintained at a certain predetermined temperature, a chamber, cooling means associated with said chamber, means containing a volatile liquid, means forming a single passage connecting said containing means with said chamber, said cooling means adapted to operate at a temperature below said predetermined temperature and means controlling said connecting means adapted to open when the pressure in said containing means rises above that maintained in said chamber.

7. In refrigerating apparatus, in combination, means forming a space whose temperature is to be regulated, a cooling medium out of thermal contact with said space, means containing a volatile liquid in thermal contact with said space, a single conduit connecting said containing means with said cooling medium, and valve means in said conduit responsive to the pressure in said containing means, said conduit adapted to direct vapor to said cooling medium and carry condensate from said cooling medium to said containing means.

8. In refrigerating apparatus, in combination, means forming a space to be maintained at a certain predetermined temperature, a chamber, cooling means associated with said chamber, said chamber being thermally separated from said space, means containing a volatile liquid, a single conduit connecting said chamber with said containing means, and valve means associated with said conduit responsive to the pressure in said containing means, said conduit adapted to convey vapor from said containing means to said chamber and condensate from said chamber to said containing means.

9. In refrigerating apparatus, in combination, a container having therein a volatile liquid, means forming a space about said container and adapted to be refrigerated thereby, a receptacle containing a cooling medium, means forming a chamber about the walls of said receptacle, a single conduit for leading vapor from said container to said chamber and condensate from said chamber to said container, said medium being at a sufficiently low temperature to condense said vapor, and means operatively responsive to the pressure of said vapor in said container for controlling flow through said conduit.

10. In refrigerating apparatus, in combination, a container having therein a volatile liquid, means forming a space about said container and adapted to be refrigerated thereby, a receptacle containing a cooling medium, means forming a chamber about the walls of said receptacle, said chamber being heat insulated from said space, a single conduit for leading vapor from said container to said chamber and condensate from said chamber to said container, said medium being at a sufficiently low temperature to condense said vapor, and means operatively responsive to the pressure of said vapor in said container for controlling flow through said conduit.

11. In refrigerating apparatus, in combination, means forming a space whose temperature is to be regulated, means containing a volatile liquid in thermal contact with said space, cooling means, a single conduit connecting said containing means with said cooling means, said cooling means being at a temperature sufficiently low to condense vapor after passing through said conduit from said containing means, and a valve controlling said conduit, said valve adapted to open and close in response to variation of said pressure in said containing means.

12. In refrigerating apparatus, in combination, means forming a cooling chamber, a container disposed within said chamber and holding a volatile liquid, a condensing chamber situated above said first-mentioned chamber, means thermally insulating said condensing chamber from said first-mentioned chamber, a low temperature refrigerant disposed in said condensing chamber, the temperature of said refrigerant being considerably below the temperature to be maintained in said first-mentioned chamber, a single conduit connecting said container to said condensing chamber to conduct vapor from said container to said condensing chamber and condensate from said chamber to said container, a valve disposed in said conduit and adapted to control the flow therethrough, and means responsive to the pressure in said container for controlling said valve, said last-mentioned means adapted to open said valve upon the boiling of said volatile liquid.

13. In refrigerating apparatus, in combination, a condensing chamber, solid carbon dioxide disposed within said condensing chamber, a tank situated below said condensing chamber and containing a volatile liquid, a single conduit connecting said condensing chamber to said tank whereby said condensing chamber is maintained at a low pressure to cause the evaporation of said volatile liquid in said tank, means forming a space about said tank and thermally insulated from said condensing chamber whose temperature is to be maintained substantially above the temperature of said solid carbon dioxide, a valve in said conduit for controlling the flow therethrough, and means responsive to the pressure in said tank for controlling the action of said valve.

14. In refrigerating apparatus, in combination, a chamber whose temperature is to be regulated, a tank disposed within said chamber containing a volatile liquid, a container for solid carbon dioxide, means forming a space about said container, the interior of said container being completely closed off from said space, a single conduit connecting said space with said tank, said volatile liquid adapted to boil at a temperature considerably above the temperature of solid carbon dioxide, a valve for controlling the flow through said conduit to said space, and means operatively responsive to pressure variation in said tank for controlling the opening and closing of said valve.

15. In refrigerating apparatus, in combination, means forming a space to be maintained at a certain temperature, containing means within said space for a volatile liquid, means forming a condensing chamber adapted to contain solid carbon dioxide and thermally insulated from said space, a single conduit connecting said containing means with said condensing chamber, and a valve responsive to the pressure in said containing means for controlling the flow of liquid or vapor through said conduit.

GEORGE E. HULSE.